Feb. 6, 1962 — L. LAGROST — 3,019,900
DENSE LIQUID MEDIA TYPE SEPARATOR
Filed Nov. 27, 1959 — 3 Sheets-Sheet 1

INVENTOR
LUCIEN LA GROST
BY
Adams & Bush
ATTORNEY

Feb. 6, 1962 L. LAGROST 3,019,900
DENSE LIQUID MEDIA TYPE SEPARATOR
Filed Nov. 27, 1959 3 Sheets-Sheet 2

INVENTOR
LUCIEN LA GROST
BY Adams & Bush
ATTORNEY

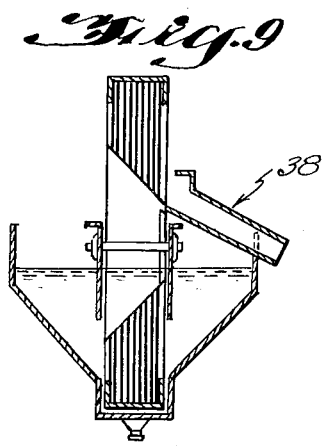
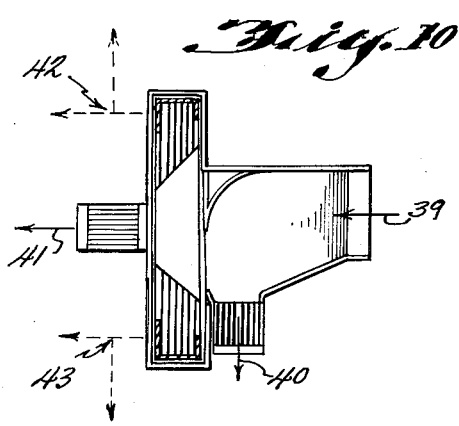
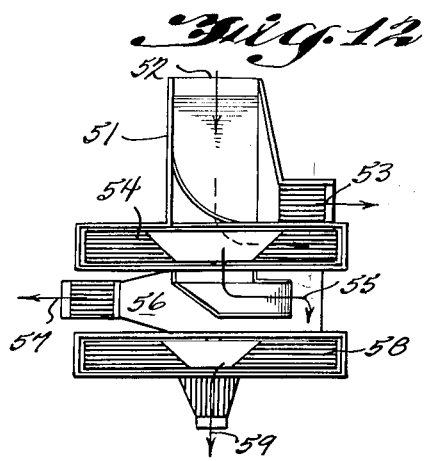
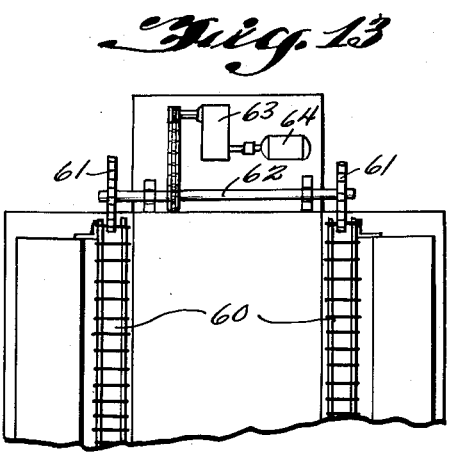
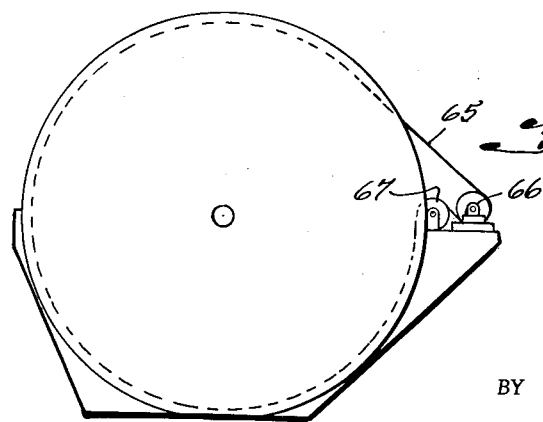

United States Patent Office 3,019,900
Patented Feb. 6, 1962

3,019,900
DENSE LIQUID MEDIA TYPE SEPARATOR
Lucien Lagrost, Fontainebleau, France, assignor to Preparation Industrielle des Combustibles, Fontainebleau, France, a French concern
Filed Nov. 27, 1959, Ser. No. 855,720
Claims priority, application France Dec. 2, 1958
13 Claims. (Cl. 209—172)

This invention relates to apparatus for separating solid materials and has more particular reference to apparatus for separating raw heterogeneous materials of different specific gravities by means of a suspension of the type employing a washing bed in the form of a sedimentation vat into and through which the dense liquid flows so that the "float" or light weight products pass over the overflow sill while the "sink" or heavy weight products are raised and removed from the sedimentation vat by means of a bucket wheel rotating about a horizontal axis.

In apparatus of the above type known to date, the wheel permits the "sinks" to be discharged on only one side as the wheel overhangs the shaft and the arms connection the wheel to the shaft prevent the passage of the "sink" discharge chute which can, consequently, only be located on the other side.

The horizontal axle wheels, fitted upon rollers, permit discharging the "sinks" on both sides of the wheel, but they present the drawback of using supporting rollers and/or driving rollers, which are subject to quick wear owing to liquor splashes and also due to the fact that the rollers located on the lifting side support a much heavier load than the others.

Some wheels, however, are supported by rollers placed at the outside. These wheels are generally preferably called drums and are used to receive the separation bath as well as to lift the "sinks." In this case, the rollers may be easily protected against the abrasive action of the liquor and the load disequilibrium is not so important as in the preceding case.

These units, however, present several drawbacks. First of all, the liquor-flow which, when entering the drum, is rectilinear, takes, later on, a V shape due to the drum rotation. On the other hand, when two successive baths are placed in the same drum, the "sinks" from the first bath are not sufficiently dewatered and tend to constantly modify the specific gravity of the second bath.

The object of the present invention is to provide novel and improved apparatus for separating raw heterogeneous solid materials of different specific gravities, by means of a suspension, of the type employing a lifting wheel rotatable about a horizontal axis for lifting the "sink" products and in which the above pointed out drawbacks are remedied.

Another object of the present invention is to provide apparatus, as characterized above, wherein the wheel is so constructed as to provide for the lateral discharge of the "sink" products therefrom outside of the plane area of the wheel and without the use of a chute, the construction thereby permitting the wheel to fit the axle and in a reduced block, thereby permitting several sets of units on the same floor.

Another object of the present invention is to provide apparatus, as characterized above, in which each bucket includes, in addition to the peripheric wall and to the wheel side-boards, at least a part of perforated surface, in order to insure draining and a part whose general plane converges with the wheel axle, in order to insure, through the rotation of the said wheel, the lateral discharge outside the overall dimensions of the wheel, of the products lifted and drained.

Other objects and advantages of the present invention will appear in the following specification when considered in connection with the accompanying drawings, wherein:

FIG. 9 is a diagrammatic vertical sectional view similar to that shown in FIG. 4, but illustrating a two product unit with two washing tables or sedimentation vats;

FIG. 10 is a diagrammatic plan view of a two product unit with washing table perpendicular to the lifting wheel;

FIG. 12 is a diagrammatic plan view of a three product unit with two perpendicular washing tables;

FIG. 13 is a fragmentary side elevational view illustrating a pinion and stud method of driving a pair of adjacent lifting wheels;

FIG. 14 shows a belt drive for a lifting wheel; and

The present invention provides novel and improved apparatus for the densimetric separation of raw heterogeneous solid materials by a dense liquid and, in general, comprises a two product separation unit including a washing table or sedimentation vat into one end of which the dense liquid and the products to be treated are introduced, the other end being provided with an overflow sill or weir over which the float products are removed with the overflow dense liquid; a lifting wheel, rotatable about a horizontal axis, for lifting and removing the "sink" products from the bottom of the washing table, the wheel being so constructed as to provide a plurality of buckets each including, in addition to the peripheral wall and side boards of the wheel, at least a part of perforated surface in order to insure draining, and a part whose "general plane" converges with the wheel axle, in order to insure, through the rotation of the wheel, the lateral discharge outside the overall dimensions of the wheel, of the products lifted and drained. The invention further contemplates the use of three and four product separation units employing two and three wheels rotatable about horizontal axes and each constructed to laterally discharge the "sink" products raised thereby. The invention further contemplates the use of a belt drive to rotate the wheels and a pinion and stud drive for a pair of adjacent wheels.

Figure 1:
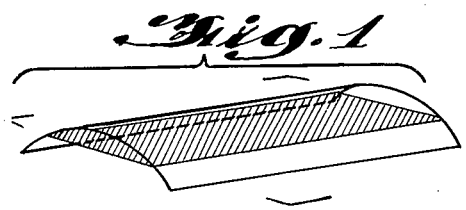
FIGS. 1 and 2 are perspective views illustrating the terminology "general plane" as applied to curved surfaces.
Figure 2:
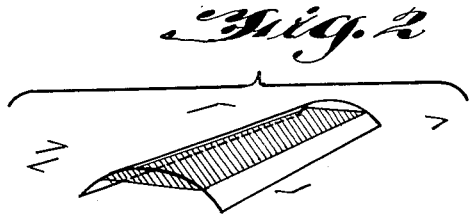

As the surface of that part of the wheel insuring the "sinks" discharge may be plane or slightly curved, the term "general plane" is to be understood to mean a plane cutting the said curved surface following two lines, so that the volume defined by the said curved surface will be separated in two approximately equal parts. In FIGS. 1 and 2 there is illustrated the "general plane" of two curved surfaces which is shown hatched in each figure.

Figure 4:
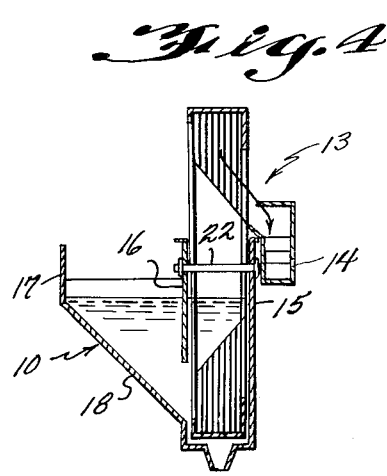
FIG. 4 is a vertical sectional view taken on the line 4—4 of FIG. 3.
Figure 3:
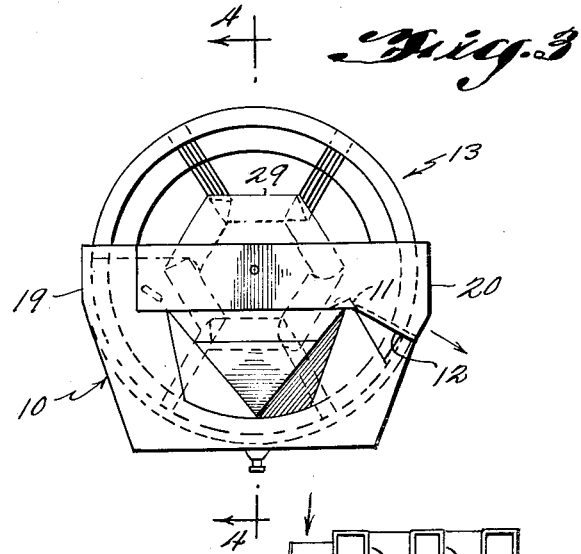
FIG. 3 is a diagrammatic and elevational view of one embodiment of a two product unit apparatus constructed in accordance with the present invention.
Figure 5:
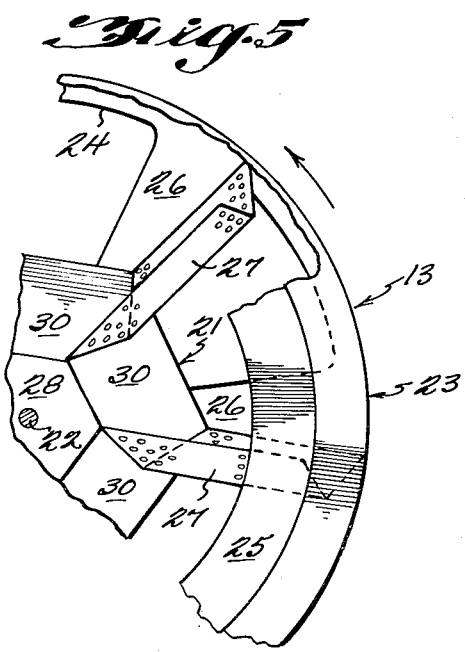
FIG. 5 is a fragmentary perspective view showing the details of construction of the type of lifting wheel illustrated in FIG. 3.

Referring now to the drawings, there is diagrammatically illustrated in FIGS. 3, 4 and 5, one embodiment of apparatus constructed in accordance with the present invention. As there shown, the apparatus comprises a static washing table or sedimentation vat 10 for receiving the solid materials being treated and the dense liquid and provided with an overflow sill or weir 11 over which the floating material, i.e., the light weight fractions, pass onto a draining chute 12, a bucket lifting wheel 13 mounted for rotation about a horizontal axis and positioned so that the lower part of its path of travel is through the sedimentation vat 10; and a chute 14 for receiving the heavy products as they are discharged from the lifting wheel.

The washing table or vat 10 may be of any suitable usual construction. It is shown in the form of a static wash box having a perpendicular outer side wall 15, an intermediate vertical wall 16, the lower end of which terminates above the bottom of the wash box, a vertical inner side wall 17 having its lower end portion 18 sloping downwardly and inwardly, and vertical end walls 19 and 20 which slope downwardly and inwardly.

In this particular modification, the wheel 13 is shown as comprising a hub 21 polygonal in transverse cross section, fitted upon a shaft 22 supported by suitable bearings carried by the outer and intermediate vertical walls of the vat 10; an external casing 23 having an inverted U-shape in transverse cross section with the inner short flange or side board 24 of the casing facing toward the vat and the outer long flange or side board 25 of the casing facing outwardly from the vat; a plurality of flat spoke-like members 26 connecting the inner flange 24 of the casing 23 to the wheel hub; and a plurality of perforated radial drain plates 27, V-shaped in cross section, with each supported by one of the spoke-like members 26 and connected at one end to the outer or peripheric wall of the casing and at the other end to the wheel hub.

The wheel hub 21 may be of any suitable construction and is shown as comprising a hexagonal inner end plate 28 and a hexagonal outer end plate 29, with each corresponding pair of sides of the two hexagonal plates connected by outer surface plates 30. The outer hexagonal plate 29 is made larger than the inner hexagonal plate 28 so that the six surface plates 30 slope at about 45° in relation to the wheel axle from the inner side to the outer side of the wheel and their outer ends, when in their high point of rotation, overhang a discharge chute 14 for the "sink" products. The wheel may be rotated by any suitable means (not shown).

The operation of the apparatus is similar to that of all "float" and "sink" washing units. The raw product is delivered, with the dense liquid, into one end of the vat 10. The "float" products are discharged over the overflow sill 11 by a liquor flow. The "sinks" are guided by the sloping walls of the vat to the bottom part of the lifting wheel 13. The "sink" products enter the outer casing 23 of the wheel, then, when the wheel is rotated in the direction of the arrows as seen in FIG. 5, they fall back upon the perforated radial walls or drain plates 27. As the wheel rotates the "sinks" are lifted in the buckets formed by the drain plates 27 and the outer casing 23 of the wheel, the liquor drains back through the perforated drain plates and, as each drain plate reaches its high rotation point, the "sinks" thereon slide onto the adjacent outer plate 30, then across the plate into the discharge chute 14.

Figure 6:
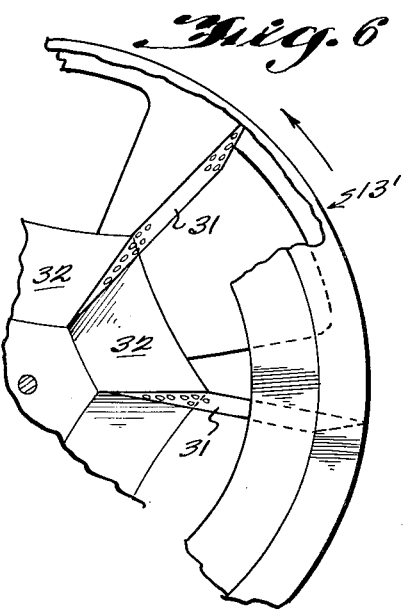
FIGS. 6, 7 and 8 are views similar to that shown in FIG. 5, but showing modified types of lifting wheels, each capable of being employed in the apparatus shown in FIG. 3.

In FIG. 6, there is illustrated a modified form of lifting wheel 13' which could be employed in the apparatus shown in FIGS. 3 and 4. In this modification, the perforated radial plates 31, which form the bottom of the buckets, are plane while the outer surface plates 32 forming the wheel hub, while still sloping in relation to the wheel axle, are slightly bent.

Figure 7:
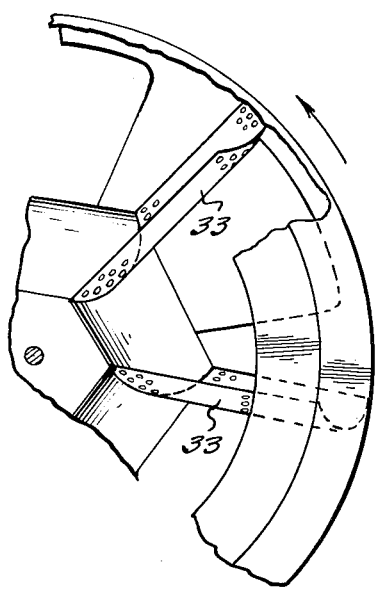

In FIG. 7, there is illustrated another modified form of a lifting wheel which is generally similar to that shown in FIG. 5, except that the perforated radial plates 33 which form the parts of the bucket are made to have the shape of a cylindrical part.

Figure 8:
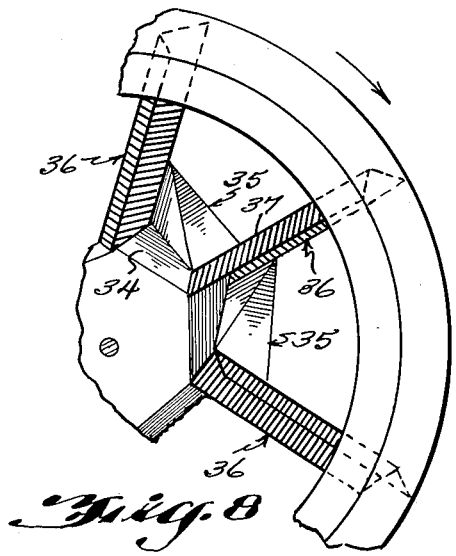

In FIG. 8, there is illustrated still another modified form of a lifting wheel. In this modification the wheel, rotating in the direction of the arrows, is shown in discharge position. The wheel is similar to that shown in FIG. 5, except that the spoke-shaped arms are omitted, the outer surface plates 34 of the wheel hub are parallel to the wheel axle. To insure the product discharge, each bucket of the wheel is fitted with a deflector 35, lying radially upon the part of the bucket nearest the center and going from the external edge of the radial drain plate 36 to the edge 37 of the dihedral formed by the preceding perforated plate, in the direction of rotation. When the bucket reaches the position shown in FIG. 8, the products slide upon the plate 34 of the hub and are discharged outside the wheel, owing to the V-shape of the perforated radial wall located ahead.

While all of the buckets, as described, are constructed to permit the "sinks" to pass entirely across the wheel, obviously, if desired, the buckets could readily be constructed to permit the "sinks" to be discharged on the side where they enter the wheel. To achieve this, it would be sufficient to incline the outer surface plates of the hub member in the opposite direction.

The particular shape of the perforated radial walls or plates employed in the apparatus should be determined by the particular type of products to be treated, each shape represents its own advantages. Should the dihedral shape be adopted, with each edge perpendicular to the wheel axle, the edges may be placed in such a way that the plane in which they are located passes through the center of gravity of the wheel, in order to center the products, thus balancing the wheel.

In FIG. 9 there is illustrated a washing unit including two wash boxes and a single wheel for the "sink" discharge of both wash boxes. Obviously, the wheel arrangement can be such that the discharge chute 38 may be placed on either side of the wheel. Obviously, too, any type of wheel construction may be employed. As shown, the wheel is of the type illustrated in FIG. 4.

In FIG. 10 there is illustrated a washing unit which may feed screens located in several different ways. As shown, the raw product arrives at 39, the separation is effected, the "floats" are discharged by a liquor flow in the direction of arrow 40 while the "sinks" fall into the bottom buckets of the wheel. This wheel may be rotated in either one direction or the other and the "sinks" can be discharged either in the direction of arrow 41 or following one or the other of arrows 42 or 43.

Figure 11:
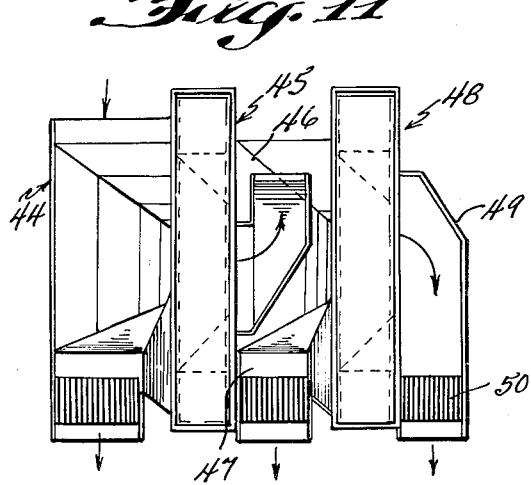
FIG. 11 is a diagrammatic plan view of a three product unit.

In FIG. 11 there is illustrated a three product washing unit. In this particular construction the "sinks" from the wash box 44 leave the lifting wheel 45 and are discharged into chute 46 feeding a second wash box 47 which operates in a similar manner to that of wash box 44 and in which the "sinks" are reclaimed by a wheel 48 which discharges same into a chute 49 fitted with a liquor sieve 50. In a unit such as above described it is possible to employ three draining vibration screens fitted parallelly and on the same floor.

In FIG. 12 there is illustrated another three product unit combining the units shown in FIGS. 4 and 10. In this unit the primary wash box 51 is fed at 52 with raw products and washing liquor. The "floats" are discharged at 53. The "sinks," lifted by the wheel 54, are sent following the arrow 55, into the secondary wash box 56, where they are submitted to a second separation. The "floats" of this secondary wash box are discharged at 57 and the "sinks," lifted by the wheel 58, are discharged at 59.

The two discharge wheels of the "sinks" may be driven by the same mechanism as illustrated in FIG. 13. As there shown, studs 60 are fixed onto each wheel and are driven by toothed pinions 61, fixed on shaft 62, driven by reducer 63, itself driven by a motor 64.

In FIG. 14 there is illustrated another driving device for use with the "sink" discharge wheels. As there shown, a flexible belt 65 coils around the wheel's peripheric wall. The side walls of the wheel are extended slightly to maintain the belt 65, driven by driving drum 66 and whose tightening is effected by a second drum 67. Drum 66 may be an automotor drum, for example, in a motor reducer group, such as in the case of a three product unit employing two wheels so that the two wheels can be driven by a single mechanism.

Figure 15:
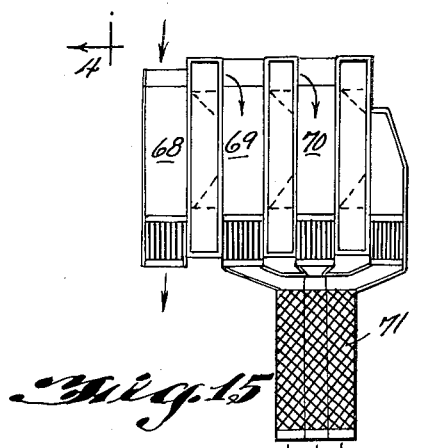
FIG. 15 is a diagrammatic plan view of a four product unit.

In FIG. 15 there is illustrated a four product unit, including three successive wash boxes 68, 69 and 70. This unit may be used in the mechanical treatment of coal from which the small floating timber pieces are first removed, the coal being afterwards separated in washed coal, middlings and shale. The timber separating is effected in wash box 68.

In wash box 69, in the "float" and "sink" sections, the washed coal, middlings and shale are reclaimed and then separated in wash box 70. A single vibro-screen 71, including three compartments, effects the draining-rinsing of each of the three categories. Contrary to the unit illustrated in FIG. 11, the "sinks" are discharged from each wheel, not when they reach the higher point of rotation, but when they approach, after a full half-rotation, the bath level in which they should be discharged. To this effect, a fixed sheet can either be disposed at the wheel side to prevent the products from leaving the wheel before they reach the desired point, or the outer surface plates of the wheel hub be inclined to the rear, closing part of the bucket opening through which the products are discharged.

From the foregoing, it readily will be seen that there has been provided novel and improved apparatus for densimetric separation of raw heterogeneous products into two or more fractions having different specific gravities; apparatus in which the lifting wheel or wheels for "sink" products rotate about a horizontal axis perpendicular to the longitudinal axis of the washing bed; and one in which the buckets of the lifting wheel are so constructed as to laterally discharge the drained "sink" products outside the overall dimensions of the wheel.

Obviously, the invention is not restricted to the particular embodiments thereof herein disclosed and described.

What is claimed is:

1. Apparatus for separating solid materials of different specific gravities by means of a suspension comprising an elongated sedimentation vat for holding a body of dense liquid, said vat having an overflow sill along one end over which the light fraction is discharged with overflow dense liquid; a lifting wheel rotatable about a horizontal axis extending normal to the longitudinal axis of said vat for lifting and discharging the "sink" products therefrom, said wheel including an annular peripheric wall having inwardly projecting flanges on its side edges forming side boards, and a plurality of circumferentially spaced buckets with each bucket including, in addition to the pheripheric wall and side boards, a generally radially extending perforated plate and a member whose general plane converges with the wheel axle, said perforated plate being connected at its outer end to the peripheral wall and side boards of the wheel and at its inner end to said member whose general plane converges with the wheel axle, the construction and arrangement being such that the perforated plates of the buckets insures drainage and the member whose general plane converges with the wheel axle insures the lateral discharge outside the wheel of the lifted and drained sink products as the wheel is rotated.

2. Apparatus as set forth in claim 1, wherein in each bucket the member whose general plane converges with the wheel axle has a plane surface over which the sink products pass.

3. Apparatus as set forth in claim 1, wherein in each bucket the perforated plate insuring drainage has a plane surface.

4. Apparatus as set forth in claim 2, wherein in each bucket the plate insuring draining has a dihedral shape with a longitudinally extending dihedral edge.

5. Apparatus as set forth in claim 4, wherein in each bucket the dihedral edge formed by the bucket plate insuring draining is perpendicular to the wheel axle.

6. Apparatus as set forth in claim 5, wherein the dihedral edges formed by the bucket plates insuring draining are on the same plane, approximately passing across the center of gravity of the wheel.

7. Apparatus as set forth in claim 2, wherein in each bucket the plate insuring draining has the shape of a portion of a cylinder.

8. Apparatus as set forth in claim 7, wherein said portion of cylinder extends substantially perpendicular to the wheel axle.

9. Apparatus as set forth in claim 1, including a second sedimentation vat positioned on the opposite side of said wheel from said first named vat and communicating with the first named vat so that the wheel raises the "sink" products from both vats.

10. Apparatus as set forth in claim 1, including a second sedimentation vat located adjacent the first named vat in position to receive the discharged "sink" products therefrom, and a bucket lifting wheel for raising the "sink" products from the second vat.

11. Apparatus as set forth in claim 10, including a single driving mechanism for driving both bucket lifting wheels.

12. Apparatus as set forth in claim 10, wherein each lifting wheel is driven by a separate mechanism.

13. Apparatus as set forth in claim 10, including mechanism for rotating each wheel at a given speed.

References Cited in the file of this patent

FOREIGN PATENTS

| | | |
|---|---|---|
| 910,402 | Germany | May 3, 1954 |
| 1,065,342 | Germany | Sept. 17, 1959 |